United States Patent
Rosenwald et al.

(10) Patent No.: US 9,418,560 B1
(45) Date of Patent: Aug. 16, 2016

(54) AUTOMATED SENSOR PLATFORM ROUTING AND TRACKING FOR OBSERVING A REGION OF INTEREST WHILE AVOIDING OBSTACLES

(71) Applicant: Raytheon Company, Waltham, MA (US)

(72) Inventors: Ross D. Rosenwald, Tucson, AZ (US); Jeffery B. Saunders, Tucson, AZ (US); David E. Bossert, Tucson, AZ (US); Erwin M. De Sa, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 14/680,672

(22) Filed: Apr. 7, 2015

(51) Int. Cl.
*G01C 21/20* (2006.01)
*G08G 5/00* (2006.01)
*B64C 39/02* (2006.01)

(52) U.S. Cl.
CPC .............. *G08G 5/003* (2013.01); *B64C 39/024* (2013.01); *G01C 21/20* (2013.01); *B64C 2201/12* (2013.01); *B64C 2201/141* (2013.01)

(58) Field of Classification Search
CPC .. G08G 5/003; B64C 39/024; B64C 2201/12; B64C 2201/141; G01C 21/20
See application file for complete search history.

(56) References Cited

U.S. PATENT DOCUMENTS

| | | | | |
|---|---|---|---|---|
| 4,299,483 A | * | 11/1981 | Grove | G01S 17/87 250/202 |
| 5,166,789 A | * | 11/1992 | Myrick | H04N 7/18 348/144 |
| 5,757,675 A | * | 5/1998 | O'Brien, Jr. | G06T 11/00 702/156 |
| 6,711,475 B2 | * | 3/2004 | Murphy | G01C 11/02 701/3 |
| 9,075,415 B2 | * | 7/2015 | Kugelmass | G05D 1/101 |
| 9,266,611 B2 | * | 2/2016 | Rambo | B64C 39/024 |
| 2014/0207365 A1 | * | 7/2014 | Pereira | G01C 21/00 701/400 |

OTHER PUBLICATIONS

Xu et al.,"Optimal complete terrain coverage using an unmanned aerial vehicle," Robotics and Automation (ICRA), 2011 IEEE, International Conference on, May 9, 2011, pp. 2513-2519.
Zuo et al., "Path planning algorithm based on sub-region for agricultural robot," Informatics in Control, Automation and Robotics (CAR), 2010 2nd International Asia Conference On, IEEE, Piscataway, NJ Mar. 6, 2010, pp. 197-200.
Jiankun Fan,"Optimal path planning and control of quadrotor unmanned aerial vehicle for area coverage," Dec. 1, 2014, retrieved from internet.

* cited by examiner

*Primary Examiner* — Michael J Zanelli
(74) *Attorney, Agent, or Firm* — Eric A. Gilford

(57) ABSTRACT

A path is automatically routed for a sensor platform that projects a constant sensor footprint to the surface to observe a region of interest without crossing into an excluded area and to tracking that path. The path is routed by defining a bounding region around the region of interest and defining a convex hull around an obstacle within the region of interest. A parallel arrangement of rectangular planks is generated from each edge of the convex hull out to the bounding region. The extent of each rectangular plank is bounded at one end by the intersection of the plank with the bounding region and at the other end by the intersection of the plank with an extension of a next edge of the convex hull. The path is routed to traverse the parallel arrangement of rectangular planks for each edge of the convex hull in a raster scan pattern and to circle the convex hull in a clockwise or counter-clockwise direction. The path is tracked and the surface below sensed to capture a sequence of sensor outputs that together cover the entire region of interest except the region excluded by the convex hull.

18 Claims, 9 Drawing Sheets

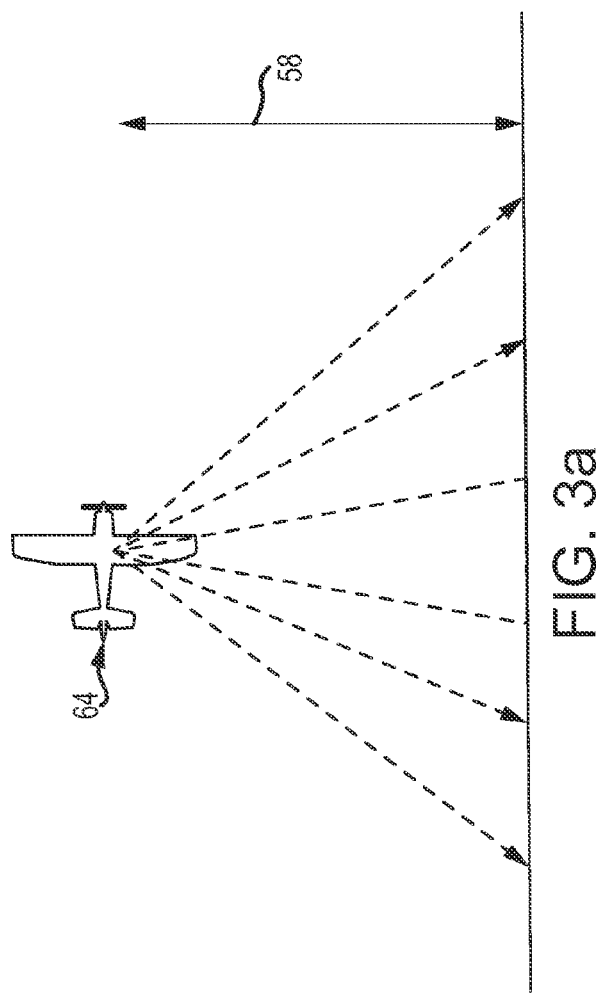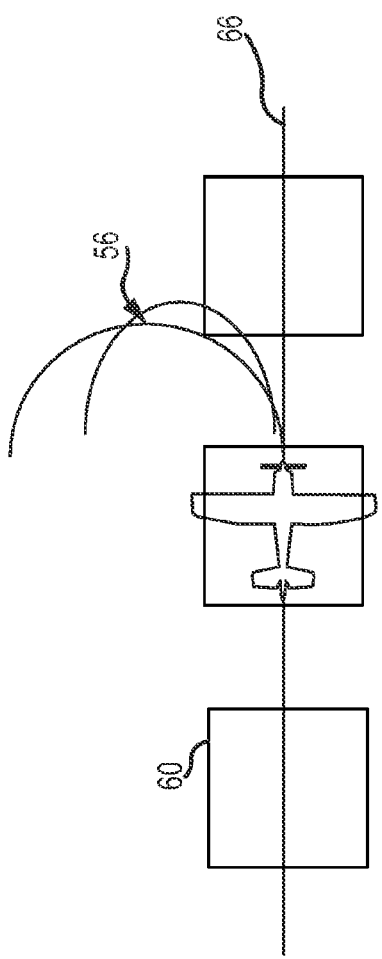

AUTOMATED SENSOR PLATFORM ROUTING AND TRACKING FOR OBSERVING A REGION OF INTEREST WHILE AVOIDING OBSTACLES

BACKGROUND OF THE INVENTION

1. Field of the Invention

This invention relates to the routing and tracking of a sensor platform to observe a region of interest while avoiding obstacles.

2. Description of the Related Art

Manned and unmanned aircraft are used to observe and sense a region of interest on the ground to generate maps, surveil the region etc. In a typical scenario the aircraft maintains (or attempts to maintain) a fixed height above the ground and projects a constant sensor footprint onto the ground. The sensor footprint may be directly below the aircraft, forward or behind but is perpendicular to the flight path when projected onto the lateral-vertical plane of the aircraft.

Typically, the aircraft is routed along a flight path that follows a raster-scan pattern back-and-forth to cover a rectangular region of interest. The aircraft senses a rectangular swath equal to the width of the sensor footprint. The swaths may overlap, say 10%. The flight path is represented as straight-line segments along each swath and connecting the end of one swath to the next. Because of the kinematic constraints on an aircraft (e.g., its turn radius), the aircraft cannot typically make the sharp turns at the end of each scan. The aircraft's tracking system will attempt to stay on the path but will inevitably overshoot the turns before returning to the path. As a result, either portions of the region of interest may not be sensed or the search area has to be oversized to accommodate for the limitations of the aircraft. This also increases the total path length of the aircraft.

If there is an excluded area within the region of interest in which the aircraft is not allowed to fly, a person manually subdivides the rectangular ROI into multiple smaller rectangular regions around the excluded area. The aircraft is routed along a path that raster scans each of the individual smaller rectangular sub-regions. The person manually determines a suitable way to subdivide the initial ROI into the smaller rectangular sub-regions and the order in which to observe each sub-region. The sub-regions must be bounded away from the excluded areas to avoid having the aircraft cross into the excluded areas when it turns at the end of each raster scan line. This approach must either tolerate voids in the sensed outputs or overlap the sub-regions. This increases the total path of the aircraft.

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

The present invention provides for automated routing of a path for a sensor platform that projects a constant sensor footprint to the surface to observe a region of interest without crossing into an excluded area and to tracking that path. The path is routed such that all of the ROI except the excluded area is covered with a reduced path length and limited redundancy. The path is routed such that the risk of crossing into the excluded area is minimized. The sensor platform tracks the smooth path or a piecewise linear approximation of the path to capture a sequence of sensor outputs that cover all non-excluded regions of the ROI.

In an embodiment, the path is routed by defining a bounding region around the region of interest and defining a convex hull around an obstacle within the region of interest. A parallel arrangement of rectangular planks is generated from each edge of the convex hull out to the bounding region. The extent of each rectangular plank is bounded at one end by the intersection of the plank with the bounding region and at the other end by the intersection of the plank with an extension of a next edge of the convex hull. The path is routed to traverse the parallel arrangement of rectangular planks for each edge of the convex hull in a raster scan pattern and to circle the convex hull in a clockwise or counter-clockwise direction. A computing system of one or more processors is configured to automatically perform these steps to route the path. The path is tracked and the surface below sensed to capture a sequence of sensor outputs that together cover the entire region of interest except the region excluded by the convex hull.

In an embodiment, the sensor platform is a manned or unmanned aircraft or a manned or unmanned underwater vehicle. In different embodiments, the sensor is an IR or visible band imager, an RF sensor, an acoustic sensor, LADAR, laser range finder, SAR or a hyper-spectral sensor.

In an embodiment, a pair of planking arrangements is generated by intersecting the planks with an extension of the next edge in a clockwise direction and a counter-clockwise direction, respectively. In another embodiment, a pair of paths is routed for each planking arrangement by circling the convex hull in a clockwise direction and a counter-clockwise direction. The path with the shortest path length is selected.

In another embodiment, the routing of the path is constrained based on the kinematics of the sensor platform (turn radius). The path segments that traverse the rectangular planks for each edge of the convex hull are straight-line segments parallel to that edge. The path segments that connect one plank to the next within each raster scan and connect the last plank of an edge to the first plank of the next edge comprise straight-line segments and arcs of a constant turn radius. These path segments are preferably computed as the Dubins path.

In another embodiment, the path is represented as a sequence of straight-line or arc waypoints. A pair of straight-line waypoints is generated at opposite ends of each rectangular plank such that the constant sensor footprint enters and exits the rectangular plank parallel to the edge of the convex hull. Additional straight-line and arc waypoints are generated that connect the exit waypoint of one plank to the entry waypoint of the next plank without violating the kinematic constraint on turn radius. These additional waypoints are preferably computed to represent the Dubins path.

In another embodiment, a kinematically constrained and preferably Dubins path is generated from a known starting position and orientation of the sensor platform to one of the rectangular planks as an entry waypoint to the bounding region.

These and other features and advantages of the invention will be apparent to those skilled in the art from the following detailed description of preferred embodiments, taken together with the accompanying drawings, in which:

BRIEF DESCRIPTION OF THE DRAWINGS

FIGS. 3a and 3b are diagrams illustrating the craft at a constant height above the surface that projects a constant sensor footprint to the surface that is perpendicular to the path when projected onto the lateral-vertical plane of the aircraft;

DETAILED DESCRIPTION OF THE INVENTION

The present invention provides for automated routing of a path for a sensor platform that projects a constant sensor footprint to the surface to observe a region of interest without crossing into an excluded area and to tracking that path. The invention provides a particular methodology for routing the path for a sub-class of ROI observation defined by specific inputs and constraints on both the platform and the methodology. This approach avoids the tedious manual labor, redundancies and path length inefficiencies of the conventional raster scan techniques to route a path to observe a ROI having an excluded area. The sensor platform may be, for example, a manned or unmanned aircraft or a manned or unmanned underwater vehicle outfitted with a sensor.

The inputs include the ROI, an obstacle to avoid, a turn radius (minimum or preferred) for the sensor platform, a height above ground, a sensor footprint and the starting position and orientation of the sensor platform. The constraints include a bounding region (typically rectangular) around the ROI, a convex hull around the obstacle, the turn radius of the sensor platform, the constant height above the surface, the constant sensor footprint on the surface (perpendicular to the path when projected onto the lateral-vertical plane of the sensor platform), coverage of all of the bounding region except the convex hull and not violating an excluded region defined by the convex hull.

Figure 1:
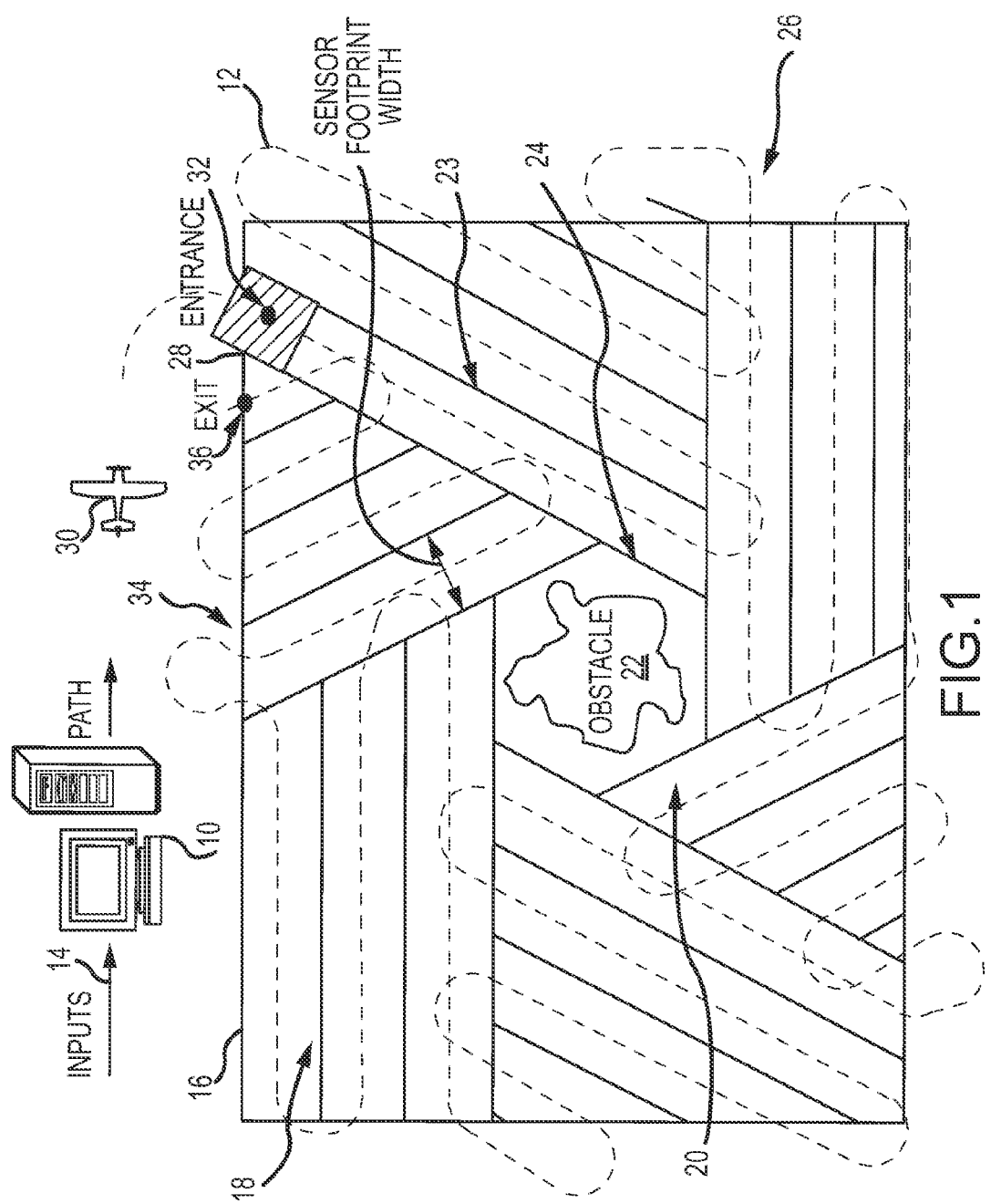
FIG. 1 is a diagram of an embodiment for routing and tracking a sensor platform to observe a region of interest with a constant sensor footprint without crossing into an excluded area.
Figure 2:
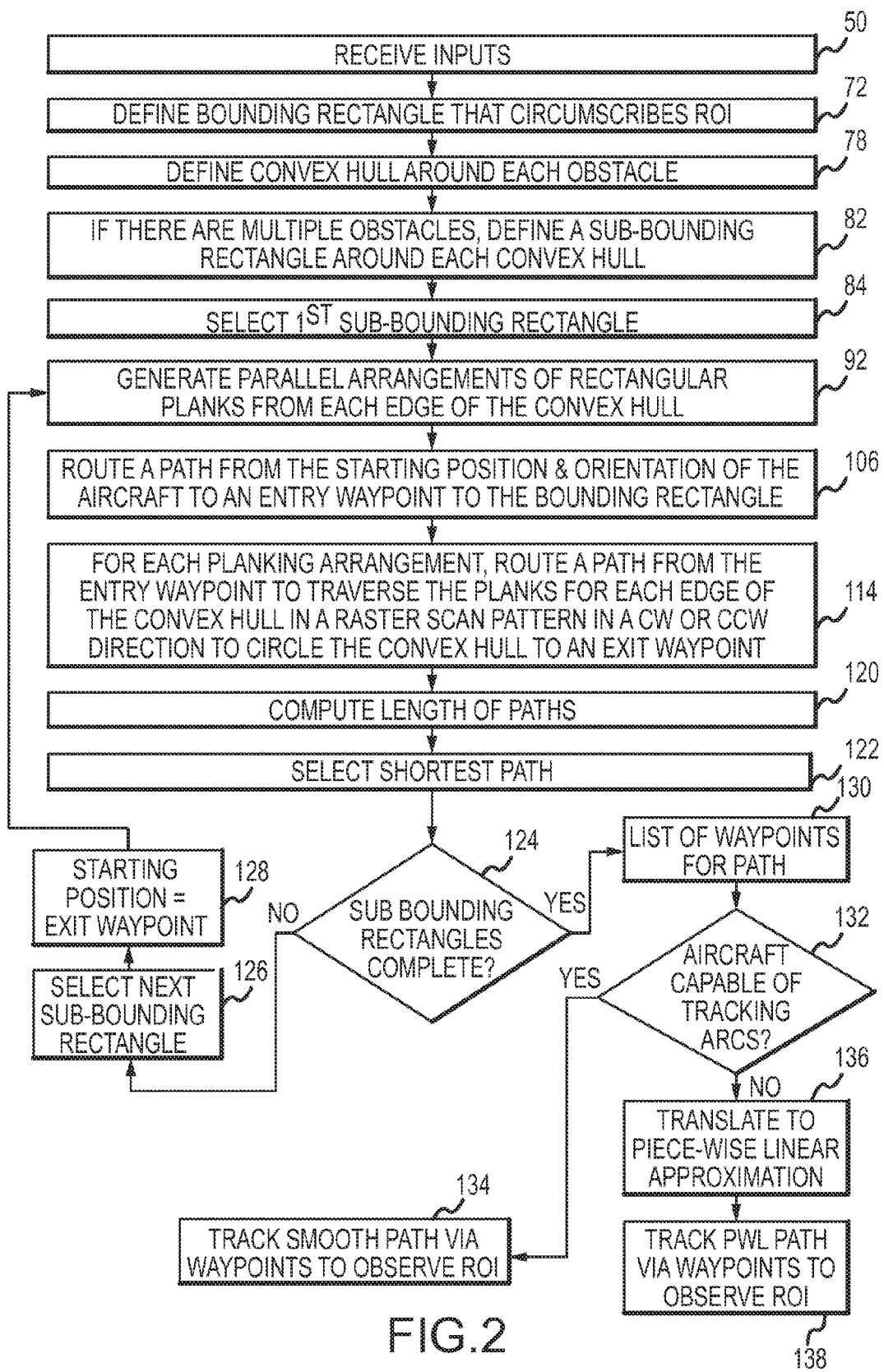
FIG. 2 is a flow diagram of an embodiment for routing and tracking the sensor platform.
Figure 4:
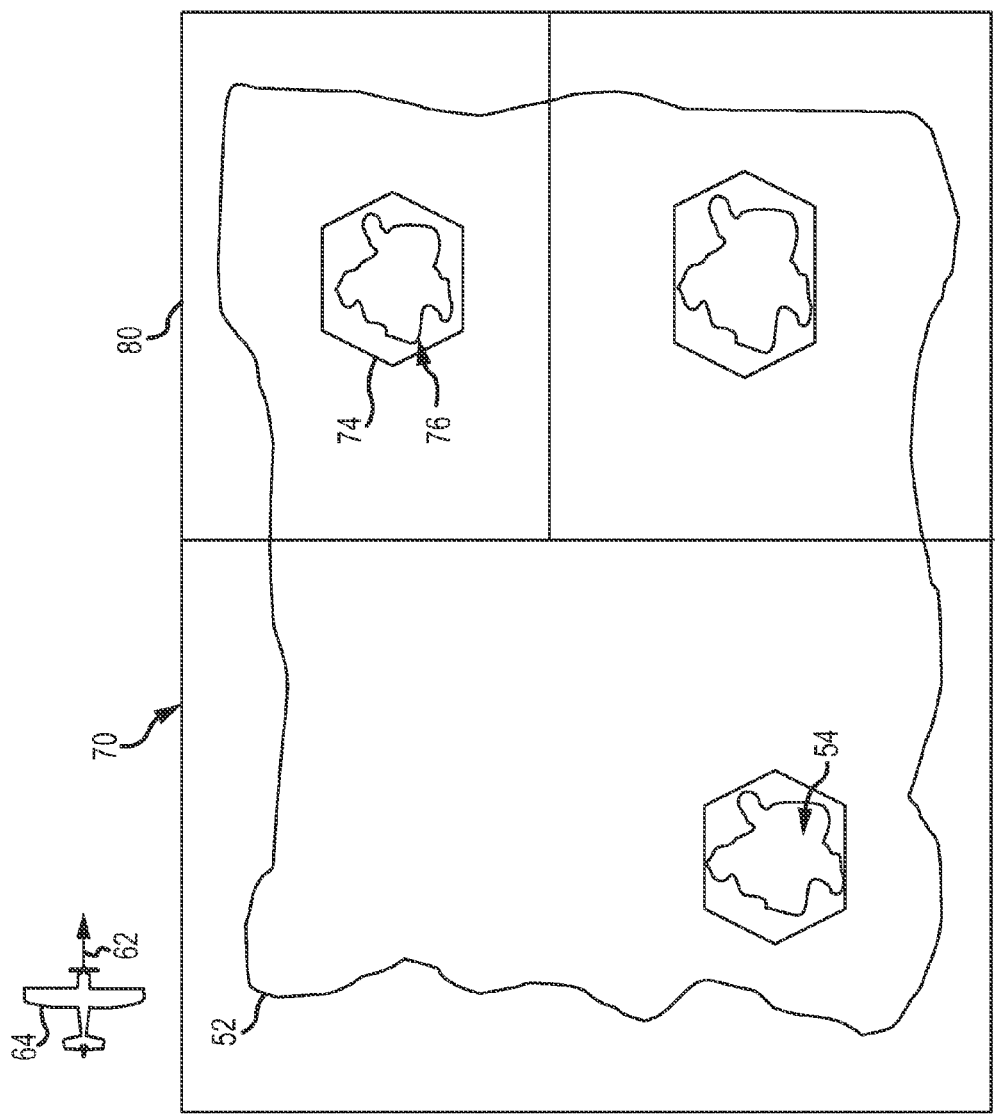
FIG. 4 is a diagram of a region of interest sub-divided into multiple bounding rectangles around each convex hull around an obstacle that demarcates an excluded area.

Referring now to FIG. 1, a computer system 10 comprising processors and memory is configured to automatically generate a path 12 in response to inputs 14 that satisfies the platform and processing constraints and output a representation (e.g. a list of waypoints) of that path for tracking.

Computer system 10 is configured to automatically define a bounding region 16 (e.g., a rectangle) around a region of interest (ROI) 18 and to define a convex hull 20 around an obstacle 22 within the ROI. For example, the computer system may define the bounding region 16 as the smallest rectangle that circumscribes the ROI and the convex hull 20 as the smallest N-sided polygon that circumscribes the obstacle. Techniques for creating a minimum area convex hull are well known.

Computer system 10 is configured to automatically generate a parallel arrangement of rectangular planks 23 from each edge 24 of the convex hull 20 out to the bounding region 16. The extent of each rectangular plank is bounded at one end by the intersection of the plank 23 with the bounding region 16 and at the other end by the intersection of the plank 16 with an extension of a next edge 24 of the convex hull. The width of the rectangular plank is at most the width of the sensor footprint. The width may be reduced slightly to produce a small overlapping of the sensor footprint. Preferably two planking arrangements 26 are generated, one in a clockwise direction around the convex hull and another in a counter-clockwise direction around the convex hull. Each planking arrangement defines segments of path 12 that must be traversed by a constant sensor footprint 28 to cover all of the bounding region 16 except the convex hull 20.

Computer system 10 is configured to automatically route path 12 from a starting position and orientation of a sensor platform (aircraft 30) to an entrance waypoint 32 to bounding region 16 at the end of one of planks 23, to traverse the parallel arrangement of rectangular planks for each edge of the convex hull in a raster scan pattern 34 and to circle the convex hull in a clockwise or counter-clockwise direction to an exit waypoint 36 at the end of the last plank. For each edge of the convex hull, path 12 follows straight-line segments parallel to the edge, minimizing or eliminating the risk that the aircraft may cross into the convex hull. To connect the planks within a raster scan and to connect the last plank of a raster scan to the first plank of the next raster scan, the path 12 follows straight-line and arc segments to make the requisite turns. The system may generate CW and CCW paths for each of the CW and CCW planking arrangements, selecting and outputting the shortest path.

Path 12 is computed based on the kinematic constraints (turning radius) of the aircraft so that the aircraft is physically capable of following the path 12. Path 12 is suitably computed to include only straight-line segments and arc segments in which the arc segments have a fixed radius equal to a preferred turning radius of the aircraft. Path 12 may be represented as a sequence of waypoints. Path 12 is preferably computed such that the path segments from the starting position to the entrance waypoint, connecting planks within a raster scan and connecting planks between successive raster scans each follow a Dubins path. The Dubins path is the shortest curve between two points having known position and orientation represented by straight-line segments and arcs of constant radius. Dubins path is represented by three segments or waypoints corresponding to either two turns and a straight-line or three turns. Techniques for computing the Dubins path are well known. Multiple candidate paths are produced that satisfy the constraints, Dubins path is the shortest of them.

Depending on the tracking capabilities of the sensor platform, path 12 is either represented by a set of waypoints (straight-line and arcs) that follow the smooth continuous path 12 or a set of waypoints (straight-line only) that are a piecewise linear approximation to path 12. The path is tracked and the surface below sensed to capture a sequence of sensor outputs that together cover the entire bounding region except the region excluded by the convex hull.

An embodiment for automatically routing a path from a known starting position and orientation to observe a region of interest while avoiding obstacles within the region of interest is illustrated in FIGS. 2-8. The system receives inputs (step 50) including a ROI 52, obstacle(s) 54, a turn radius 56 (minimum and/or preferred), a height above ground 58, a constant sensor footprint 60 and a starting position and orientation 62 of a sensor platform 64. Constant sensor footprint 60 may be projected straight down, forward or rearward from the platform but remains perpendicular to the path 66 when projected onto a lateral-vertical plane of the platform.

The system defines a bounding rectangle 70 (step 72) around ROI 52 and defines a convex hull 74 around each obstacle 76 (step 78) within bounding rectangle 70. If there are multiple obstacles the system defines a sub-bounding rectangle 80 around each convex hull to define multiple search areas (step 82). Obstacles that are less than one sensor footprint apart may be combined.

The system selects a first sub-bounding rectangle 80 (step 84), for example the one closest to the starting position of the aircraft, and generates a parallel arrangement of rectangular planks 86 from each edge 88 of the convex hull 74 out to the bounding rectangle 70 (step 92), (i.e., a planking arrangement 90). The extent of each rectangular plank is bounded at one end by the intersection of the plank with the bounding region and at the other end by the intersection of the plank with an extension of a next edge of the convex hull. Planking arrangement 90 is generated by drawing lines 94 parallel to the edge of the convex hull spaced at at most the width 96 of the constant sensor footprint 60 until the last line is entirely outside bounding rectangle 70, intersecting the parallel lines 94 with the bounding rectangle 70, extending the next edge 88 of the convex hull to the bounding region 70 and intersecting the parallel lines with the extended next edge 98. If the parallel lines are spaced equal to the width of the constant sensor footprint there will be no overlap in the raster scan pattern. The planks are arranged so that there is no gap between the convex hull and the planks.

Figure 5A:
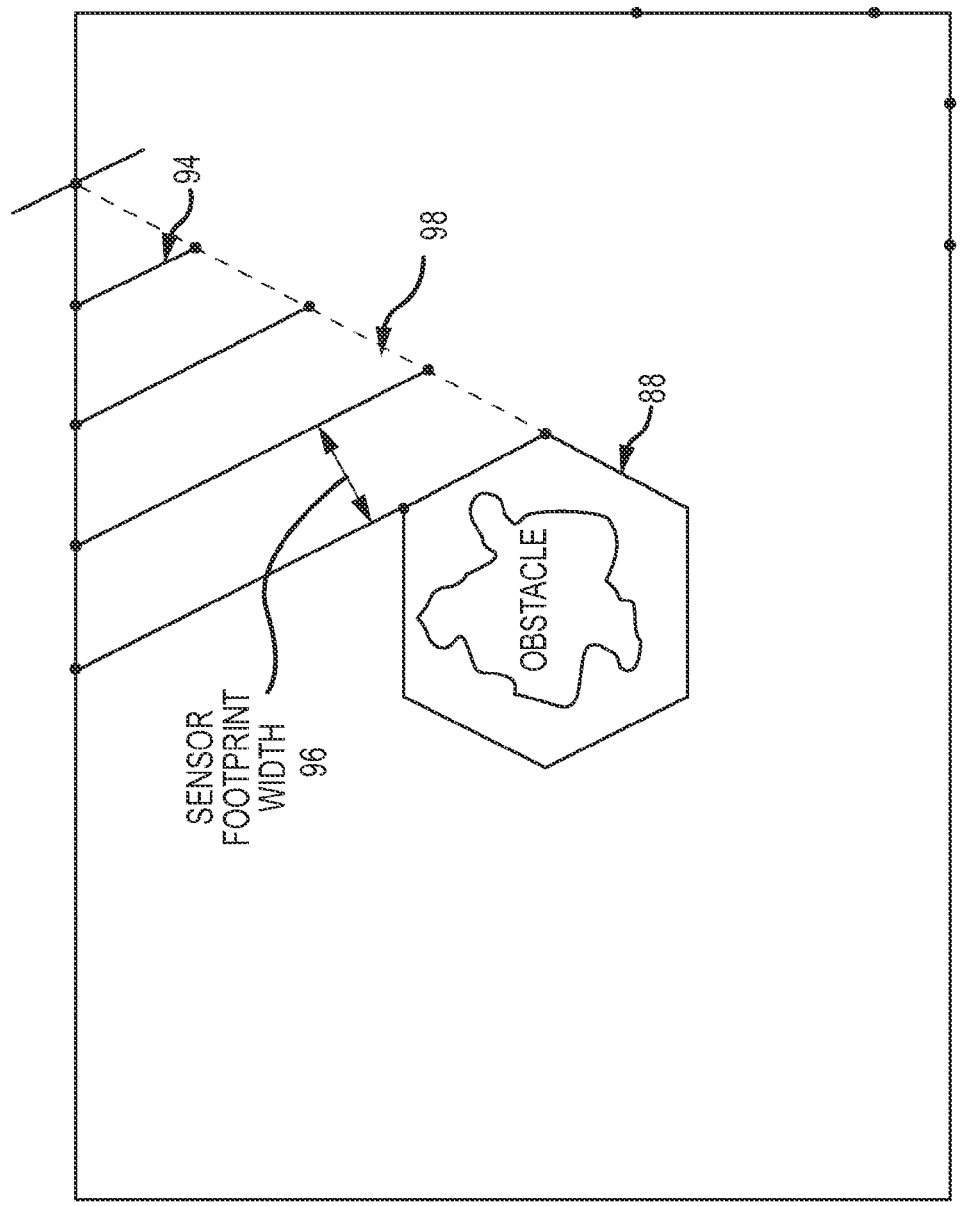
FIGS. 5a and 5b are diagrams illustrating a planking arrangement in a clockwise direction.
Figure 5B:
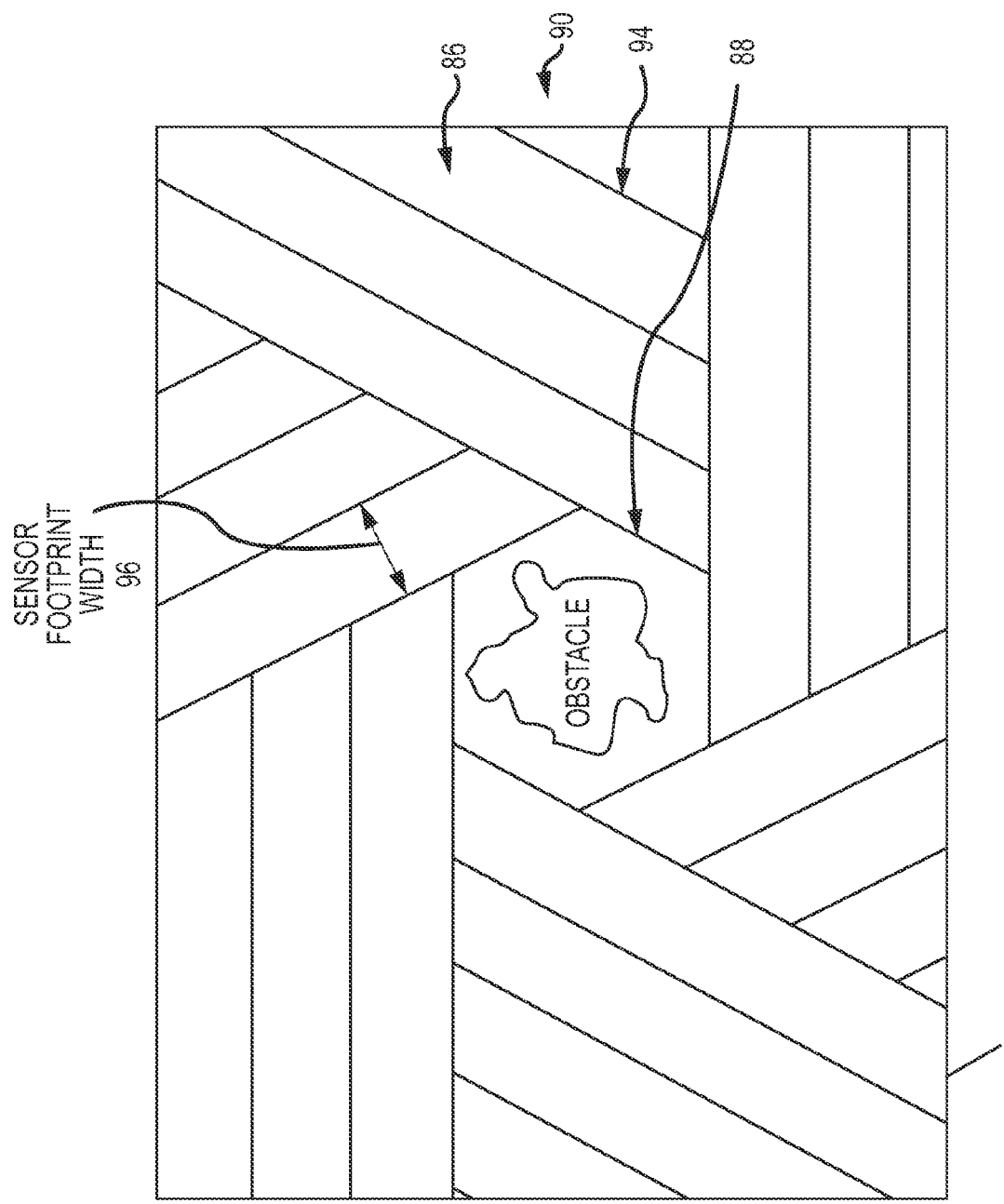
Figure 6:
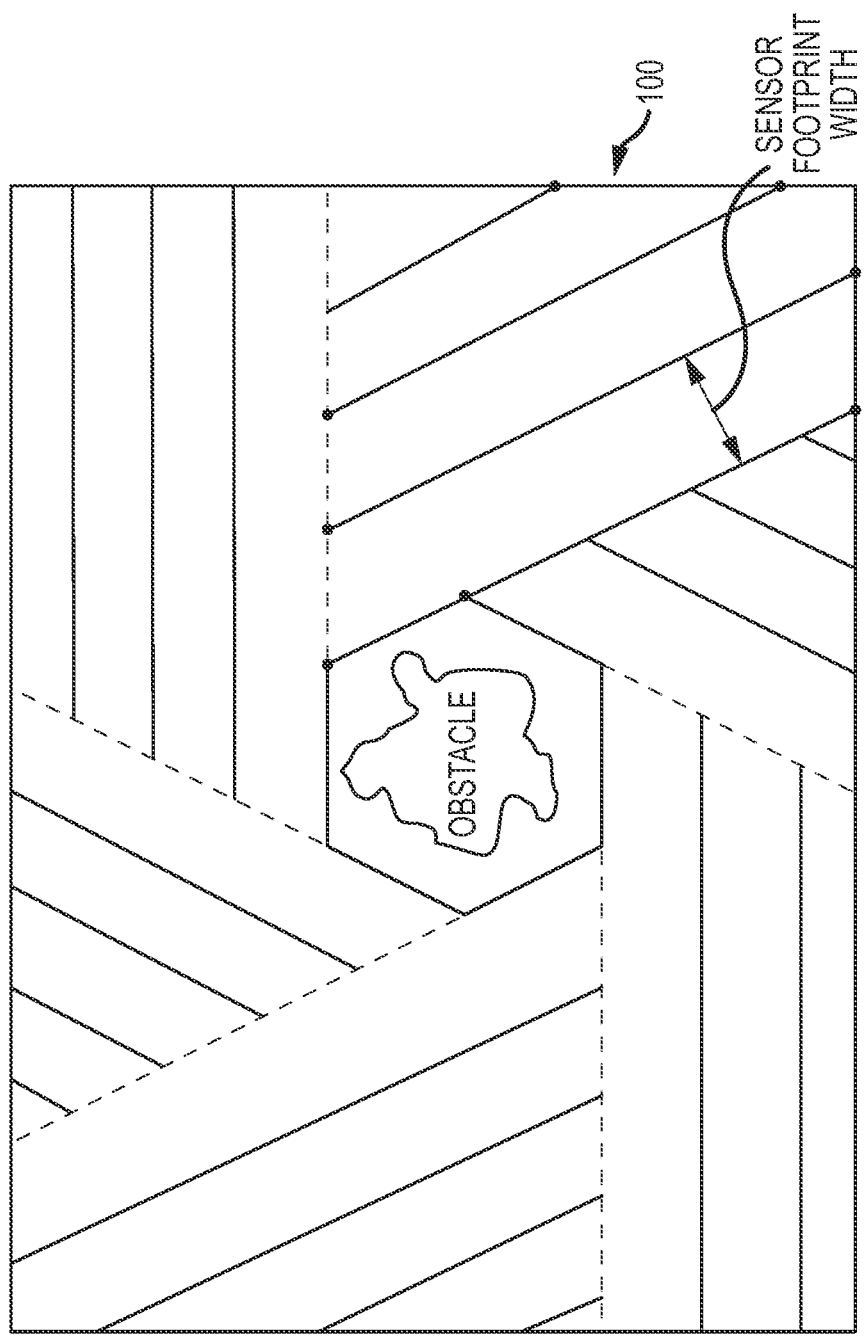
FIG. 6 is a diagram illustrating a planking arrangement in a counter-clockwise direction.

The planking arrangement 90 illustrated in FIGS. 5a and 5b is generated by moving in a clockwise direction to the next edge of the convex hull. The same technique moving in a counter-clockwise direction to the next edge of the convex hull produces a planking arrangement 100 illustrated in FIG. 6. The overall method for routing a path may compute one or both of the planking arrangements. The resulting total path length may be shorter with one of the two planking arrangements.

Figure 7:
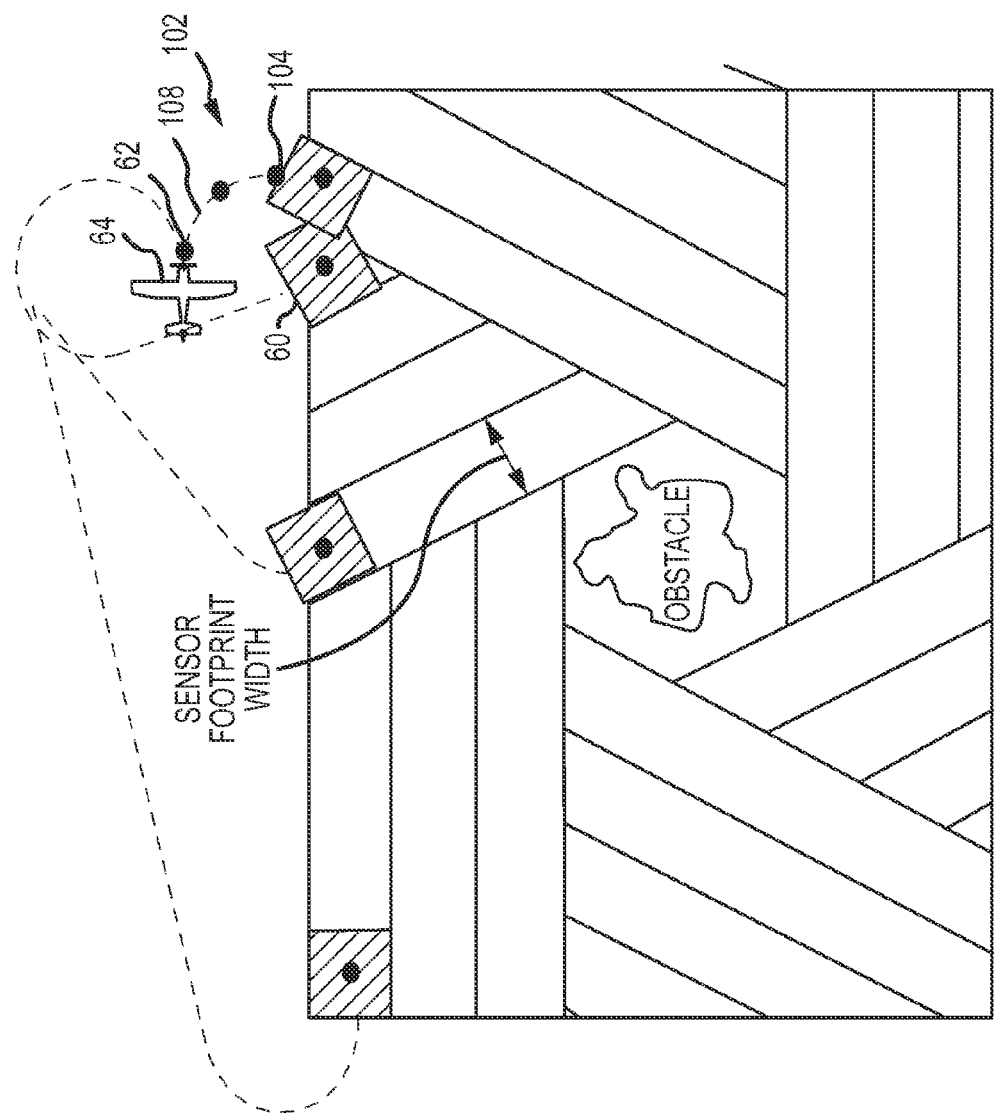
FIG. 7 is a diagram illustrating routing a path from the platform starting position and orientation to an entry waypoint.
Figure 8:
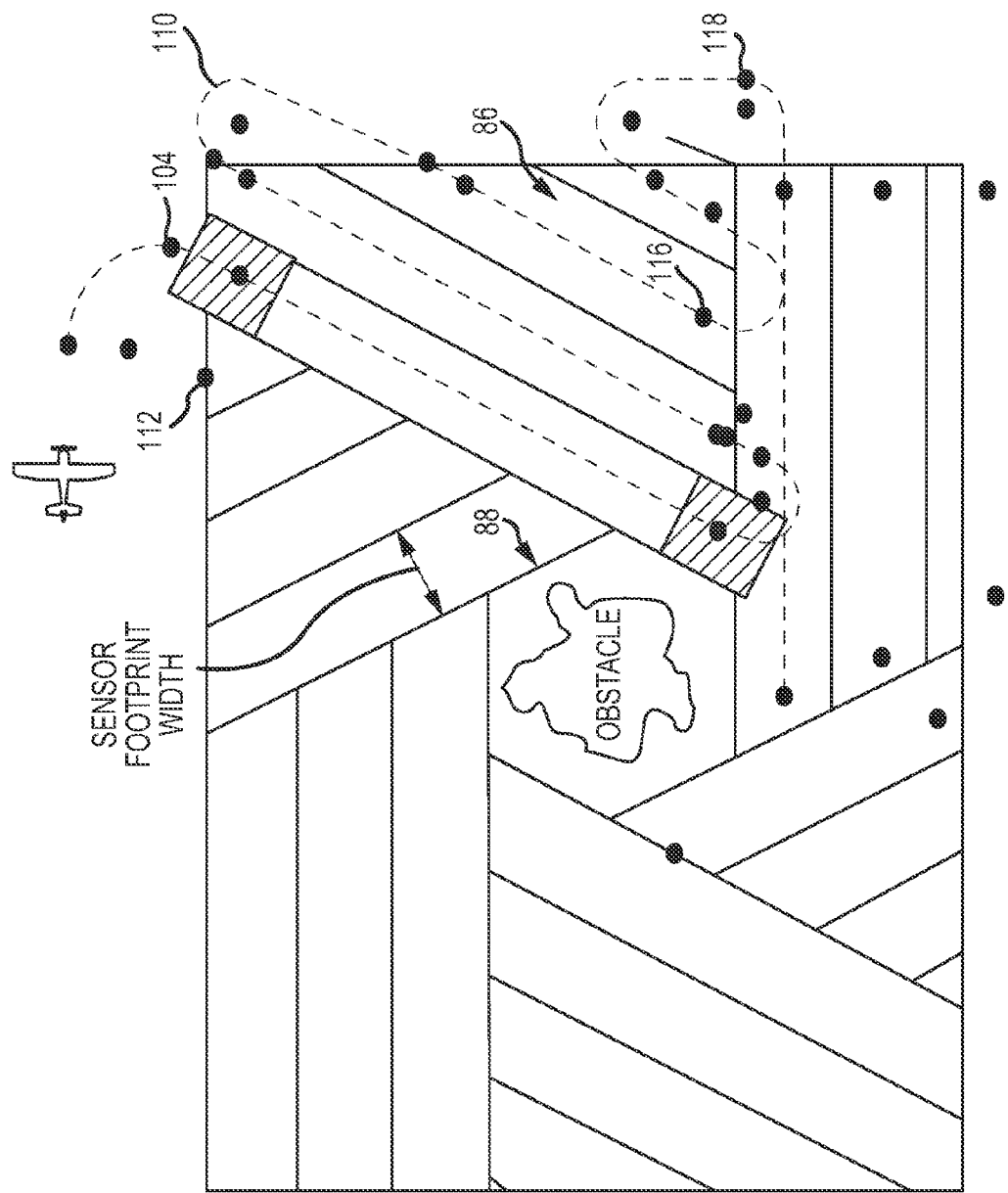
FIG. 8 is a diagram illustrating routing the path from the entry waypoint to traverse the planking arrangement to an exit waypoint.

For one or both of the planking arrangements, the system routes a path 102 from the known starting position and orientation 62 of aircraft 64 to an entry waypoint 104 to the bounding rectangle 70 (step 106). The entry waypoint 104 is suitably selected to position and orient the constant sensor footprint 60 at the beginning of one of planks 86. As shown in FIG. 7, the aircraft projects the constant sensor footprint 60 straight down such that the entry waypoint lies at the center of the constant sensor footprint. If the aircraft were configured to project the constant sensor footprint at a forward or rearward look angle the entry waypoint would be offset to compensate.

The system may be configured to select entry waypoint 104 and route the path to the waypoint using a variety of different approaches with or without regard to kinematic constraints (or preferences) of the aircraft, minimum path length from the starting position to the entry waypoint or preferences for routing the path through the planking arrangement(s). For example, the system could be configured to route straight-line paths from the starting position to each plank along the edge of the bounding region nearest the starting point of the aircraft and select the shortest one. Alternately, the system could be configured to route the path with straight-line and curved path segments that do not violate the kinematic constraints (minimum or preferred turn radius) of the aircraft that provides the shortest path to the entry waypoint. The system could be configured to route the path with straight-line and curved path segments of constant radius (the minimum or preferred turn radius) that provides the shortest path i.e., the Dubins path. The Dubins path comprises three segments including either two arcs and a line segment or three arcs. The path can be thought of as a combination of straight segments and left or right hand turns of constant radius. Each segment may be represented by a straight-line or arc waypoint 108 that informs a tracker how to follow the Dubins path. Straight-line waypoints lie on the path. Arc waypoints may lie on the path and specify the radius of the arc or they may lie off the path at the center of a circle on which the arc is defined (see FIG. 8 for example). The system may be configured to select an entry waypoint from only either the plank adjacent the convex hull or the plank closest to the bounding rectangle.

For one or both of the planking arrangements, the system is configured to route a path 110 from entry waypoint 104 to traverse the parallel arrangement of rectangular planks 86 for each edge 88 of the convex hull in a raster scan pattern and to circle the convex hull in a clockwise or counter-clockwise direction to an exit waypoint 112 (step 114). The path may be generated for a clockwise direction, a counter-clockwise direction or both.

Similarly to selection of the entry waypoint and the path to the entry waypoint, the system may be configured to route the path 112 through the planking arrangement(s) using a variety of different approaches with or without regard to kinematic constraints (or preferences) of the aircraft, minimum path length from the starting position to the entry waypoint or preferences for routing the path through the planking arrangement(s). For example, the system could be configured to route straight-line paths along the length of each plank, connect one plank to the next and to connect one raster scan to the next. Alternately, the system could be configured to route the path with straight-line and curved path segments that do not violate the kinematic constraints (minimum or preferred turn radius) of the aircraft that provides the shortest path to the entry waypoint. The system could be configured to route the path with straight-line and curved path segments of constant radius (the minimum or preferred turn radius) that provides the shortest path i.e., the Dubins path. The segments along the length of each plank would be straight-line segments bounded by waypoints 116. The segments connecting one plank to the next and one raster scan to the next would be Dubins paths defined by additional waypoints 118. The constant turn radius required for Dubins path may be the same for all path segments or may vary. For example, some segments may use the preferred turn radius, others the minimum turn radius and others possibly a fixed turn radius between the preferred and minimum turn radius.

If configured to compute multiple paths, e.g., CW or CCW paths through CW or CCW planking arrangements, the system computes the length of each path (step 120) and selects the path with the shortest length (step 122).

The system determines if all of the sub-bounding rectangles have been completed (step 124). If not, the system selects the next sub-bounding rectangle (step 126) and sets the starting point position and orientation to be the exit waypoint position and orientation of the just completed sub-bounding rectangle (step 128) and repeats steps 92, 106, 114, 120 and 122 until all of the sub-bounding rectangles are completed.

The system generates a list of waypoints for the selected path (step 130). Assuming the system generated a path consistent with the kinematic constraints of the aircraft, the system determines whether the aircraft is capable of tracking curved segments or "arcs" (step 132). Some aircraft tracking systems can track both straight-line and arc waypoints to follow a curved path. Other aircraft tracking systems can track only straight-line waypoints. If the aircraft has the capability to track arcs, the system outputs the original list of waypoints to the aircraft and the aircraft tracks the smooth path via the original waypoints to sense the surface below to capture a sequence of sensor outputs that together cover all of the region of interest except the region excluded by the convex hull (step 134). If not, the system translates the path and waypoints to a piece-wise linear approximation (step 136) and the aircraft tracks the piece-wise linear path via the translated waypoints to observe the region of interest (step 138).

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A method of routing a sensor platform along a path to observe a region of interest and avoid obstacles within the region of interest, said sensor platform having a sensor that projects a constant sensor footprint to the surface of the region of interest, the method comprising:
    defining a bounding region around the region of interest;
    defining a convex hull around an obstacle within the region of interest;
    generating a parallel arrangement of rectangular planks from each edge of the convex hull out to the bounding region, the extent of each said rectangular plank bounded at one end by the intersection of the plank with the bounding region and at the other end by the intersection of the plank with an extension of a next edge of the convex hull;
    routing a path to traverse the parallel arrangement of rectangular planks for each edge of the convex hull in a raster scan pattern and to circle the convex hull in a clockwise or counter-clockwise direction; and
    tracking the path and sensing the surface below to capture a sequence of sensor outputs that together cover the entire region of interest except the region excluded by the convex hull.

2. The method of claim 1, wherein the parallel arrangement of rectangular planks is generated by drawing lines parallel to the edge of the convex hull spaced at at most the width of the constant sensor footprint until the last line is entirely outside the bounding region, intersecting the parallel lines with the bounding region, extending the next edge of the convex hull to the bounding region and intersecting the parallel lines with the extended next edge.

3. The method of claim 1, wherein a pair of planking arrangements are generated by intersecting the planks with an extension of the next edge in a clockwise direction and a counter-clockwise direction, respectively, wherein a pair of paths are routed for each planking arrangement by circling the convex hull in a clockwise direction and a counter-clockwise direction, further comprising selecting the shortest length path.

4. The method of claim 1, wherein the path is routed with a maximum curvature based on a constraint on the turn radius of the sensor platform.

5. The method of claim 4, wherein a portion of the path that traverses the parallel arrangement of rectangular planks for each edge of the convex hull is parallel to that edge.

6. The method of claim 4, wherein portions of the path that connect one plank to the next within each raster scan and connect the last plank of an edge to the first plank of the next edge comprise straight-line segments and arcs of a constant turn radius.

7. The method of claim 6, wherein each said portion is calculated as a Dubins path to connect one plank to the next.

8. The method of claim 6, wherein tracking the path comprises smoothly tracking the straight-line segments and arcs.

9. The method of claim 4, wherein the path is represented as a sequence of straight-line or arc waypoints, further comprising:
    generating a pair of straight-line waypoints at opposite ends of each rectangular plank such that the constant sensor footprint enters and exits the rectangular plank parallel to the edge of the convex hull; and
    generating additional straight-line and arc waypoints that connect the exit waypoint of one plank to the entry waypoint of the next plank without violating the constraint on turn radius.

10. The method of claim 9, wherein the additional waypoints comprise only straight-line or arc waypoints of a constant turn radius, and wherein the additional waypoints are generated to represent a Dubins path from the exit waypoint of one plank to the entry waypoint of the next plank.

11. The method of claim 10, further comprising setting the constant turn radius for each Dubins path such that the path is represented by a pair of arc waypoints and a single straight-line waypoint.

12. The method of claim 9, wherein the sensor has a known starting position and orientation, further comprising a Dubins path from the known starting position and orientation to the entry waypoint of one of the rectangular planks as an entry waypoint to the bounding region.

13. The method of claim 4, further comprising generating a piecewise linear approximation of the path, wherein tracking the path comprises tracking the piecewise linear approximation.

14. The method of claim 1, further comprising configuring one or more computer processors to automatically execute the steps of defining the bounding region, defining the convex hull, generating the parallel arrangement of rectangular planks and routing the path.

15. A method of routing a sensor platform along a path having a maximum curvature determined by a turn radius of the sensor platform to observe a region of interest and avoid obstacles within the region of interest, said sensor platform having a sensor that projects a constant sensor footprint to the surface of the region of interest, the method comprising:
    defining a bounding region around the region of interest;
    defining a convex hull around an obstacle within the region of interest;
    generating clockwise and counter-clockwise planking arrangements around the convex hull that comprise a parallel arrangement of rectangular planks from each edge of the convex hull out to the bounding region, the extent of each said rectangular plank bounded at one end by the intersection of the plank with the bounding region and at the other end by the intersection of the plank with an extension of a next edge of the convex hull in the clockwise and counter-clockwise direction;
    for each planking arrangement, routing clockwise and counter-clockwise paths comprising only straight-line and arc paths segments that do not exceed the maximum curvature to traverse the parallel arrangement of rectangular planks for each edge of the convex hull in a raster scan pattern that circle the convex hull in clockwise and counter-clockwise directions, respectively;
    selecting the path having the shortest total length; and
    tracking the path and sensing the surface below to capture a sequence of sensor outputs that together cover the entire region of interest except the region excluded by the convex hull.

16. The method of claim 15, wherein each of the paths is a Dubins path comprising only straight-line path segments and arc path segments of a fixed turn radius.

17. A method of routing a sensor platform along a path having a maximum curvature determined by a turn radius of the sensor platform to observe a region of interest and avoid obstacles within the region of interest, said sensor platform having a sensor that projects a constant sensor footprint to the surface of the region of interest, the method comprising:

defining a bounding region around the region of interest;

defining a convex hull around an obstacle within the region of interest;

generating a parallel arrangement of rectangular planks from each edge of the convex hull out to the bounding region, the extent of each said rectangular plank bounded at one end by the intersection of the plank with the bounding region and at the other end by the intersection of the plank with an extension of a next edge of the convex hull;

generating a pair of straight-line waypoints at opposite ends of each rectangular plank such that the constant sensor footprint enters and exits the rectangular plank parallel to the edge of the convex hull;

generating additional straight-line and arc waypoints that connect the straight-line waypoint exiting one plank to the straight-line waypoint entering the next plank with at most the maximum curvature;

routing a path to connect the waypoints to traverse the parallel arrangement of rectangular planks for each edge of the convex hull in a raster scan pattern and to circle the convex hull in a clockwise or counter-clockwise direction; and tracking the path and sensing the surface below to capture a sequence of sensor outputs that together cover the entire region of interest except the region excluded by the convex hull.

18. The method of claim 17, wherein the additional waypoints comprise only straight-line or arc waypoints of a constant turn radius, and wherein the additional waypoints are generated to represent a Dubins path from the straight-line waypoint exiting one plank to the straight-line waypoint entering the next plank.

* * * * *